United States Patent [19]

Hixenbaugh

[11] 4,352,486

[45] Oct. 5, 1982

[54] PRESSURE PROBE FOR METALLURGICAL VESSELS

[75] Inventor: Dennis L. Hixenbaugh, Pittsburgh, Pa.

[73] Assignee: Pennsylvania Engineering Corp., Pittsburgh, Pa.

[21] Appl. No.: 250,235

[22] Filed: Apr. 2, 1981

[51] Int. Cl.³ .......................... C21B 7/24; G01L 19/06; G01L 7/00

[52] U.S. Cl. .......................................... 266/99; 266/89; 73/714; 73/756

[58] Field of Search ........................ 266/89, 99; 432/47, 432/50; 73/706, 714, 756, 152

[56] References Cited

U.S. PATENT DOCUMENTS

| | | | |
|---|---|---|---|
| 961,305 | 6/1910 | Machlet | 432/50 |
| 975,077 | 11/1910 | Rockwell . | |
| 1,464,738 | 8/1923 | Eaton et al. . | |
| 1,535,992 | 4/1925 | Fisher et al. . | |
| 1,615,503 | 1/1927 | Brown . | |
| 1,937,199 | 11/1933 | Kathner . | |
| 1,955,855 | 4/1934 | Marx | 73/152 X |
| 2,177,033 | 10/1939 | Buell . | |
| 2,676,195 | 10/1950 | Hart . | |
| 3,015,234 | 1/1962 | Springfield . | |
| 3,057,941 | 10/1962 | Schwartzwalder . | |
| 3,062,052 | 11/1962 | Kolb | 73/152 X |
| 3,203,243 | 8/1965 | Lyles | 73/152 X |
| 3,373,007 | 3/1968 | Ticknor . | |
| 3,652,068 | 3/1972 | Truppe et al. . | |
| 4,214,735 | 7/1980 | Beentjes . | |
| 4,239,532 | 12/1980 | Allersma et al. | 266/89 X |

FOREIGN PATENT DOCUMENTS

| | | | |
|---|---|---|---|
| 1069926 | 5/1967 | United Kingdom | 73/756 |

*Primary Examiner*—L. Dewayne Rutledge
*Assistant Examiner*—Alan E. Schiavelli
*Attorney, Agent, or Firm*—Fred Wiviott

[57] ABSTRACT

A shielded pressure probe for measuring the pressure within a metallurgical vessel includes a tubular housing extending through and spaced from an opening in the vessel's refractory lining. The housing has an opening at its external end for receiving a probe therein and its interior end is closed. A plurality of perforations are formed in the housing and open toward the refractory defining the vessel opening to expose the probe to the vessel's interior while eliminating any straight line paths therebetween.

4 Claims, 2 Drawing Figures

PRESSURE PROBE FOR METALLURGICAL VESSELS

BACKGROUND OF THE INVENTION

This invention relates to metallurgical vessels and more particularly to pressure probes for such vessels.

In metallurgical processes, such as those used in the reduction or refining of ferrous ores or metal, it is often necessary to make pressure measurements. Conventional pressure probes for sensing pressure in the interior of metallurgical vessels consist of a pipe extending through an opening in the vessel lining. An aperture in the pipe exposes a pressure sensing element to vessel pressure. Such pressure probes require frequent maintenance as a result of damage and clogging caused by molten waste products or the molten material being treated in the vessel.

SUMMARY OF THE INVENTION

It is an object of the invention to provide a new and improved pressure probe for metallurgical vessels.

Another object of the invention is to provide a pressure probe for metallurgical vessels wherein maintenance is minimized.

A further object of the invention is to provide a pressure probe for metallurgical vessels which is not subject to clogging.

These and other objects and advantages of the present invention will become more apparent from the detailed description thereof taken with the drawings.

In general terms, the invention comprises a pressure probe in combination with the refractory lining of a metallurgical vessel arranged to define an opening for receiving said probe. The probe includes tubular means disposed within and spaced from the margins of the opening and a pressure sampling tube is disposed within the tubular means. A plurality of openings are formed in the tubular means and face the margins of the vessel opening such that the refactory and the tubular member shield the probe from any straight line path within said vessel but permit the probe to sample the pressure within the vessel.

DETAILED DESCRIPTION OF THE PREFERRED EMBODIMENT

Figure 1:
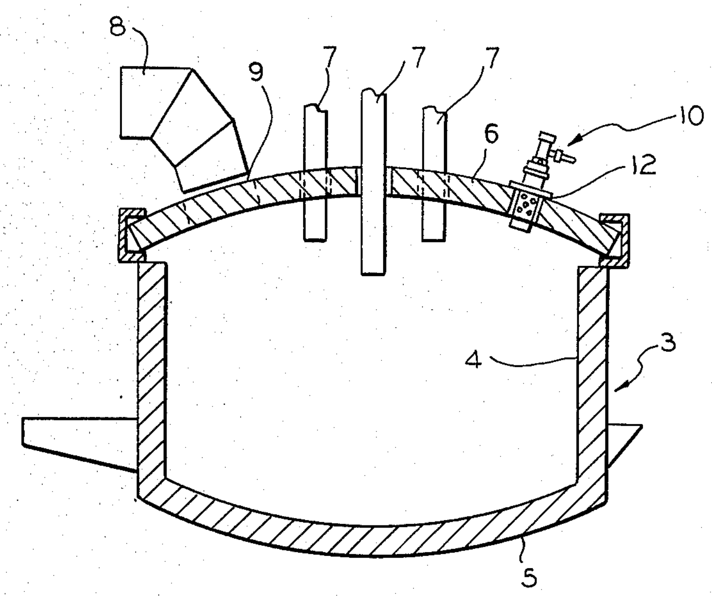
FIG. 1 schematically illustrates a metallurgical vessel in which the pressure probe according to the invention may be employed.

FIG. 1 shows a metallurgical vessel 3 such as an electric arc furnace, for example, which is shown to have generally cylindrical side walls 4, a dished hearth 5 and a domed roof 6 all formed of a suitable refractory material. One or more electrodes 7 extend through suitable openings in the roof 6 for heating a furnace charge. Gaseous waste products generated during such metal processing are collected by a gas collecting hood 8 which is connected to a gas cleaning system (not shown). The hood 8 is normally positioned relative to the opening 9 in the roof so as to maintain the pressure within the vessel within preselected limits. In order to determine vessel pressure, a pressure probe 10 is disposed within an opening 12 formed in any suitable location, such as the roof 6.

While the invention is being illustrated in relation to an electric arc furnace 3, this is merely exemplary since the pressure probe 10 in accordance with the invention may be employed in a variety of metallurgical vessels such as converters, holding furnaces, and the like.

Figure 2:
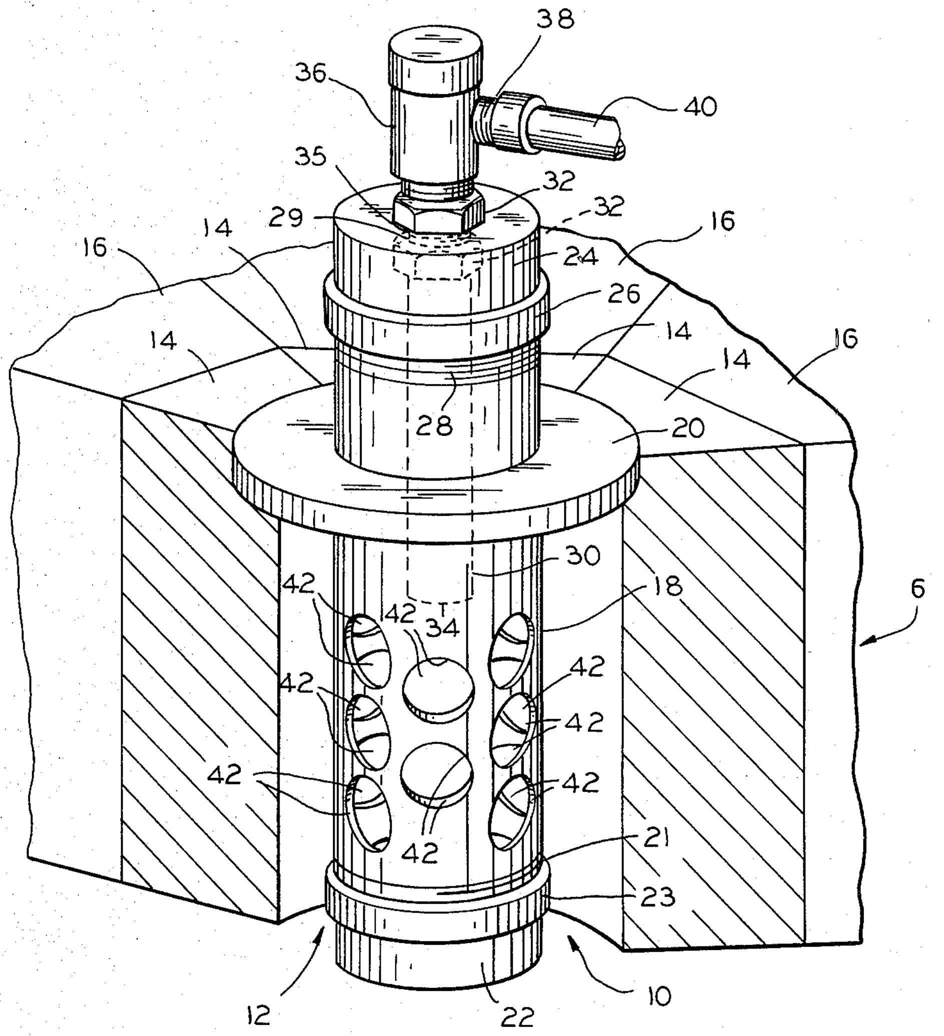
FIG. 2 is a perspective view of the pressure probe in accordance with the present invention.

The pressure probe 10 according to the present invention is shown more particularly in FIG. 2 to be disposed in opening 12 of roof 6. As those skilled in the art will appreciate, the walls and roof of such furnaces may comprise any suitable refractory material having any convenient form such as refractory blocks. For example, the opening 12 may be formed by a plurality of specially shaped blocks 14 disposed in a circular array with the surrounding portions of the roof formed of conventionally shaped blocks 16.

The probe 10 generally includes a hollow tubular housing 18 which is mounted axially within opening 12 by means of an annular flange 20 affixed intermediate its ends. Flange 20 may also be affixed to the roof 6 in any suitable manner such as by means of bolts and nuts (not shown).

The lower end of housing 18 has externally formed threads 21 for receiving a cup-shaped end cap 22 having an internally threaded skirt 23 which engages the threads 21. A similar end cap 24 has an internally threaded lower skirt 26 for engaging threads 28 formed on the upper end of housing 18. The upper end cap 24 also has a central aperture 29 for receiving a hollow tubular member 30 which extends coaxially within housing 18. Member 30 has a substantially smaller outer diameter than the inner diameter of housing 18 and is substantially shorter in length and may be affixed to cap 24 in any suitable manner such as by means of nuts 32 disposed above and below cap 24 and received on a threaded section 35 formed on member 30. The lower end 34 of member 30 is open and its upper end is closed by cap 36 having a laterally extending nipple 38 for receiving the end of a hollow tubular conduit 40.

Disposed within member 30 is a conventional pressure responsive device (not shown) which senses the pressure within housing 18 through the open lower end 34 of member 30. The pressure responsible device may be coupled to a suitable indicator, microprocessor or control by leads extending through conduit 40.

A plurality of apertures 42 are formed in the tubular housing 18 and in the area between flange 20 and the lower end cap 22. As seen in the drawing, the tubular housing 18 and end cap 22 extend a distance from flange 20 about equal to the height of the refractory blocks 14 so that the apertures 42 open into the gap between housing 18 and the surfaces of the refractory blocks 14 which define opening 12. With this configuration, none of the openings in housing 18 are exposed in any straight line paths to the interior of the vessel. Accordingly, while the interior of housing 18 will be at the same pressure as the interior of the metallurgical vessel in which it is located, the openings 42 will not tend to become clogged by metal or slag which may be projected toward the probe 10. Even if some of the openings 42 become clogged by solidified material, the large number of openings will still permit pressure sampling. Further, because the open lower end 34 of tubular member 30 is above the level of the openings 42, it will not tend to become closed by material which may enter the housing 18 through said openings. As a result, the pressure probe may continue to take the pressure samples for a long period of time without the need for maintenance or cleaning.

While only a single embodiment of the invention has been illustrated and described, it is not intended to be limited thereby but only by the scope of the appended claims.

I claim:

1. A pressure probe in combination with a refractory lining of a metallurgical vessel, said refractory being arranged to define an opening for receiving said probe, said probe including a tubular housing disposed within and spaced from the surface of the refractory defining said opening to provide a gap therebetween, said housing having a side wall facing said gap and an inner end exposed to the interior of said furnace, closure means closing the inner end of said housing, pressure probe means disposed within said tubular housing, a plurality of spaced apart openings formed in the side wall of said housing and opening into said gap, the refractory, said closure means and said side wall shielding said probe from any straight line path within said vessel, said openings being arranged to permit said probe to sample the pressure within said vessel.

2. The combination set forth in claim 1 wherein said openings are formed intermediate the ends of said side wall, said probe being disposed adjacent the unapertured outermost portion of said housing relative to the interior of said vessel.

3. The combination set forth in claims 1 or 2 wherein said probe includes a tubular member coaxially mounted within said tubular housing and being open at its innermost end for exposing a pressure sensitive means within said tubular member to the pressure within said vessel.

4. The combination set forth in claim 3 wherein said openings are spaced apart axially and circumferentially relative to said side wall and between the ends thereof to expose a substantial portion of the interior of said housing to said gap, said openings all being spaced outwardly from the inner margin of the opening defined by said refractory.

* * * * *